US008918891B2

(12) United States Patent
Coggeshall et al.

(10) Patent No.: US 8,918,891 B2
(45) Date of Patent: Dec. 23, 2014

(54) IDENTITY MANIPULATION DETECTION SYSTEM AND METHOD

(75) Inventors: Stephen Coggeshall, Del Mar, CA (US);
Wenzhong Zhao, San Diego, CA (US);
Viktoria Rojkova, Escondido, CA (US)

(73) Assignee: ID Analytics, Inc., San Diego, CA (US)

( * ) Notice: Subject to any disclaimer, the term of this patent is extended or adjusted under 35 U.S.C. 154(b) by 0 days.

(21) Appl. No.: 13/494,976

(22) Filed: Jun. 12, 2012

(65) Prior Publication Data

US 2013/0333048 A1     Dec. 12, 2013

(51) Int. Cl.
*G06F 21/62* (2013.01)
*H04L 29/06* (2006.01)

(52) U.S. Cl.
CPC ............ *H04L 63/12* (2013.01); *H04L 63/1408* (2013.01)
USPC .............................................. 726/26; 726/22

(58) Field of Classification Search
CPC ........................... G06F 21/6245; G06Q 20/382
USPC .......................................... 726/26, 22; 902/5
See application file for complete search history.

(56) References Cited

U.S. PATENT DOCUMENTS

| | | | |
|---|---|---|---|
| 5,361,201 A | 11/1994 | Jost | |
| 5,745,654 A | 4/1998 | Titan | |
| 5,794,178 A | 8/1998 | Caid | |
| 5,819,226 A | 10/1998 | Gopinathan | |
| 5,930,764 A | 7/1999 | Melchione | |
| 5,991,758 A | 11/1999 | Ellard | |
| 6,038,555 A | 3/2000 | Field | |
| 6,094,643 A | 7/2000 | Anderson | |
| 6,095,413 A | 8/2000 | Tetro | |
| 6,173,275 B1 | 1/2001 | Caid | |
| 6,226,408 B1 | 5/2001 | Sirosh | |
| 6,311,178 B1 | 10/2001 | Bi | |
| 6,330,546 B1 | 12/2001 | Gopinathan | |
| 6,366,897 B1 | 4/2002 | Means | |
| 6,430,539 B1 | 8/2002 | Lazarus | |
| 6,513,018 B1 | 1/2003 | Culhane | |
| 6,523,019 B1 | 2/2003 | Borthwick | |
| 6,597,775 B2 | 7/2003 | Lawyer | |
| 6,974,079 B1 | 12/2005 | Strothmann | |
| 6,993,514 B2 | 1/2006 | Majoor | |
| 7,234,156 B2 | 6/2007 | French | |
| 7,584,146 B1 | 9/2009 | Duhon | |

(Continued)

OTHER PUBLICATIONS

"Falcon ID, Your weapon in the fight against identity fraud" product literature from www.fairisaac.com, Sep. 2004.

(Continued)

*Primary Examiner* — Joseph P Hirl
*Assistant Examiner* — Kalish Bell
(74) *Attorney, Agent, or Firm* — San Diego IP Law Group LLP

(57) ABSTRACT

The present invention provides, in at least one embodiment, a device, system, and method for resolving the identity of at least one person and listing their identity information attributes. The system detects intentional and improper falsifications of the person's personal identity information. The system calculates a manipulation score that indicates the likelihood that the person intentionally and improperly attempted to manipulate their identity information. The manipulation score can be based on the number, type, and systematic nature of the person's variations in their identity information. The system also calculates a collection of identity manipulation attributes that describe explicitly the manner of the improper manipulation, such as the number of Social Security numbers used.

22 Claims, 11 Drawing Sheets

(56) References Cited

U.S. PATENT DOCUMENTS

| | | |
|---|---|---|
| 2001/0001148 A1 | 5/2001 | Martin |
| 2001/0001877 A1 | 5/2001 | French |
| 2001/0011245 A1 | 8/2001 | Duhon |
| 2001/0037288 A1 | 11/2001 | Bennett |
| 2001/0047326 A1 | 11/2001 | Broadbent |
| 2002/0029154 A1 | 3/2002 | Majoor |
| 2002/0083008 A1 | 6/2002 | Smith |
| 2002/0099649 A1 | 7/2002 | Lee |
| 2002/0155830 A1 | 10/2002 | Iyer |
| 2002/0161609 A1 | 10/2002 | Zizzamia |
| 2002/0188556 A1 | 12/2002 | Colica |
| 2003/0018558 A1 | 1/2003 | Heffner |
| 2003/0041047 A1 | 2/2003 | Chang |
| 2003/0208684 A1 | 11/2003 | Camacho |
| 2004/0090439 A1 | 5/2004 | Dillner |
| 2004/0093261 A1 | 5/2004 | Jain |
| 2004/0111359 A1 | 6/2004 | Hudlock |
| 2004/0153663 A1 | 8/2004 | Clark |
| 2004/0242262 A1 | 12/2004 | Turner |
| 2005/0021476 A1 | 1/2005 | Candella |
| 2005/0108063 A1 | 5/2005 | Madill |
| 2005/0144143 A1 | 6/2005 | Freiberg |
| 2005/0160280 A1 | 7/2005 | Caslin |
| 2006/0101508 A1 | 5/2006 | Taylor |
| 2006/0149674 A1 | 7/2006 | Cook |
| 2006/0202012 A1 | 9/2006 | Grano |
| 2006/0271457 A1 | 11/2006 | Romain |
| 2007/0090181 A1 | 4/2007 | Varadarajan |
| 2007/0129999 A1 | 6/2007 | Zhou |
| 2007/0208640 A1 | 9/2007 | Banasiak |
| 2009/0164232 A1* | 6/2009 | Chmielewski et al. ........... 705/1 |
| 2010/0293090 A1* | 11/2010 | Domenikos et al. ........... 705/38 |

OTHER PUBLICATIONS

Dr. Stephen Coggeshall, ID:A Labs Finds 20 Million Improper Identity Manipulators, Proceedings of ID360 at UT Center for Identity, 2012, 12, The University of Texas at Austin, Austin, TX.

* cited by examiner

400
                                               /

| Person 1 (ID # 0000001) | Person 2 (ID # 0000002) | Person 3 (ID # 0000003) |
|---|---|---|
| Event # 861, 713, 541 | Event # 247, 798, 623 | Event # 152, 138, 417 |
| Event # 982, 793, 347 | Event # 548, 486, 489 | Event # 263, 895, 986 |
| Event # 1, 223, 796, 963 | Event # 865, 135, 953 | Event # 309, 896, 255 |
| Event # 1, 352, 652, 853 | Event # 1, 221, 159, 683 | |
| | Event # 1, 385, 896, 675 | |

Fig. 4   Sort events into people

500
                                               /

Remotely observed person #1            ID Analytics person # 937465746
Remotely observed person #2            ID Analytics person # 746287663
Remotely observed person #3   Is most  ID Analytics person # 364982657
Remotely observed person #4   likely   ID Analytics person # 136957153
Remotely observed person #5            ID Analytics person # 376249382

Fig. 5   Determine likely right person

600

| First Name | Last Name | SSNs | DOBs | Address | Zip | Phone |
|---|---|---|---|---|---|---|
| | JOHNSON | | | 307 GRANADA DR | 72994 | |
| ANITRA | MCWILLAN | | | 1401 WALKER AVE #331 | 72091 | 8476644253 |
| LATASHA | MCWILLIAMS | 815015642 | 1/11/1980 | 1095 SPRING MEADOW | 71946 | 8474511519 |
| MCCLELAND | MCMILLAN | 815115642 | 2/21/1980 | 303 EAST SHR | 71830 | 3950056410 |
| | MCNULTY | | | 102 5TH ST | 71323 | 3920056710 |
| | | | | 317 WINONA ST | 71324 | |

Fig. 6    Examine variations

700

| First Name | Last Name | SSNs | DOBs | Address | Zip | Phone |
|---|---|---|---|---|---|---|
| | JOHNSON | | | 307 GRANADA DR | 72994 | |
| ANITRA | MCWILLAN | | | 1401 WALKER AVE #331 | 72091 | 8476644253 |
| LATASHA | MCWILLIAMS | 815015642 | 1/11/1980 | 1095 SPRING MEADOW | 71946 | 8474511519 |
| MCCLELAND | MCMILLAN | 815115642 | 2/21/1980 | 303 EAST SHR | 71830 | 3950056410 |
| | MCNULTY | | | 102 5TH ST | 71323 | 3920056710 |
| | | | | 317 WINONA ST | 71324 | |

Fig. 7    Identify improper manipulation

3 different first name, 5 different last names,
2 different SSNs and 2 different DOBs Summary Statistics for Some Sever Identity Manipulators

| First Name | City | SSNs | DOBs | First Name2 | M/F | Last Name |
|---|---|---|---|---|---|---|
| Frank | NY | 146 | 7 | 7 | n | 5 |
| Jamal | Cleveland | 106 | 12 | 6 | n | 5 |
| Paula | St. Louis | 101 | 7 | 5 | y | 9 |
| William | NY | 100 | 4 | 3 | n | 6 |
| William | Miami | 100 | 2 | 3 | y | 6 |
| William | NY | 69 | 14 | 6 | n | 13 |
| Linda | Detroit | 46 | 25 | 5 | y | 10 |
| Augustina | San Francisco | 27 | 18 | 17 | y | 10 |
| Theresa | Detroit | 22 | 21 | 14 | y | 14 |
| Heifi | Minneapolis | 33 | 28 | 4 | n | 4 |
| Joseph | Minneapolis | 48 | 9 | 5 | n | 6 |
| Anthony | DC | 44 | 7 | 3 | n | 5 |
| Dorothy | Seattle | 41 | 11 | 3 | n | 3 |
| Alton | Minneapolis | 44 | 5 | 7 | y | 2 |
| Trisco | Miami | 43 | 4 | 8 | n | 3 |
| Mary | Houston | 32 | 10 | 5 | y | 9 |
| Lisa | Phoenix | 29 | 21 | 3 | n | 2 |
| Robert | Phoenix | 40 | 3 | 3 | n | 5 |
| Michael | Phoenix | 24 | 10 | 9 | y | 8 |
| Corey | Atlanta | 39 | 5 | 4 | y | 3 |
| Smithton | DC | 33 | 5 | 5 | n | 7 |
| Brent | NY | 21 | 12 | 7 | n | 9 |
| Raymond | Seattle | 28 | 13 | 3 | n | 3 |
| William | Tampa | 34 | 4 | 3 | n | 4 |
| Melissa | Tampa | 32 | 7 | 3 | n | 3 |
| Dorian | Durham | 30 | 8 | 5 | n | 2 |
| William | Miami | 34 | 4 | 3 | n | 4 |
| Jody | Atlanta | 21 | 2 | 17 | y | 5 |
| Dawn | Atlanta | 24 | 15 | 3 | y | 3 |
| Joseph | Durham | 22 | 9 | 8 | y | 5 |

Fig. 8

| Rank | 3-Digit-Zip | Region |
|---|---|---|
| 1 | 777 | Beaumont, TX |
| 2 | 799 | El Paso, TX |
| 3 | 482 | Detroit, MI |
| 4 | 485 | Flint, MI |
| 5 | 392 | Jackson, MS |
| 6 | 464 | Gary, IN |
| 7 | 489 | Lansing, MI |
| 8 | 774 | SE Houston, TX |
| 9 | 700 | New Orleans, LA |
| 10 | 770 | Houston, TX |
| 11 | 785 | Mcallen, TX |
| 12 | 784 | Corpus Christi, TX |
| 13 | 751 | SE Dallas, TX |
| 14 | 387 | Greenville, MS |
| 15 | 483 | NW Detroit, MI |
| 16 | 775 | SE Houston, TX |
| 17 | 797 | Midland, TX |
| 18 | 48 | Rural SE Maine |
| 19 | 776 | Beaumont, TX |
| 20 | 788 | W San Antonio, TX |
| 21 | 750 | N Dalla, TX |
| 22 | 197 | Wilmington, DE |
| 23 | 114 | Queens, NY |
| 24 | 780 | W San Antonio, TX |
| 25 | 701 | New Orleans, LA |
| 26 | 77 | NE of Trenton, NJ |
| 27 | 782 | San Antonio, TX |
| 28 | 191 | Philadelphia, PA |
| 29 | 110 | E Queens, NY |
| 30 | 103 | Staten Island, NY |
| 31 | 783 | W Corpus Christi, TX |
| 32 | 199 | S Wilmington, DE |
| 33 | 928 | Anaheim, CA (S of LA) |
| 34 | 773 | N of Houston, TX |
| 35 | 711 | Shreveport, LA |
| 36 | 651 | S Jefferson City, MO |
| 37 | 926 | Costa Mes/Irvine, CA |
| 38 | 219 | SW of Wilmington, DE |
| 39 | 381 | Memphis, TN |
| 40 | 723 | West Memphis, AR |

900

| Name | # of SSNs | # of DOBs | # of First Names | # of Last Names | # of Genders | # of Addresses | # of Phone #s |
|---|---|---|---|---|---|---|---|
| Latesha Chapman | 7 | 6 | 5 | 3 | 2 | 27 | 25 |
| Thomas Milton | 12 | 8 | 13 | 8 | 1 | 29 | 36 |
| Dawn Thompson | 11 | 5 | 4 | 2 | 1 | 17 | 22 |
| Latoya Thompson | 24 | 12 | 9 | 5 | 2 | 25 | 22 |
| Ryan Milton | 7 | 8 | 3 | 2 | 1 | 16 | 13 |
Fig. 11    Identity fraud ring
All these people shared:
-several addresses
-fragments of names, SSNs, and DOBs
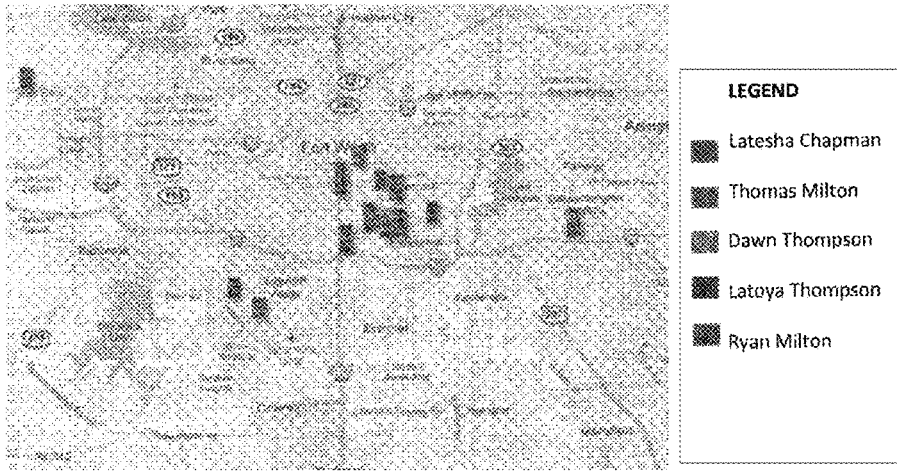
Fig. 12    Identity fraud ring

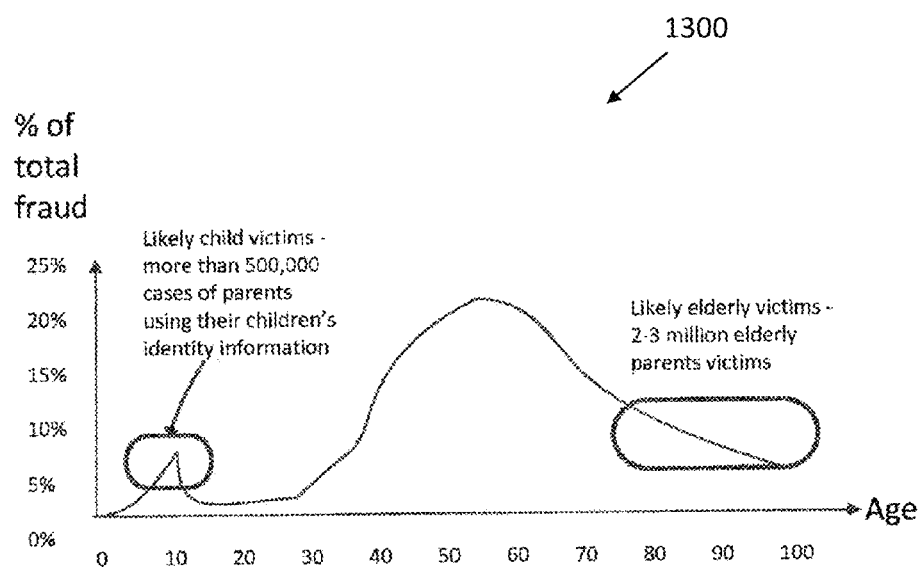
Fig. 13    Parent-child theft
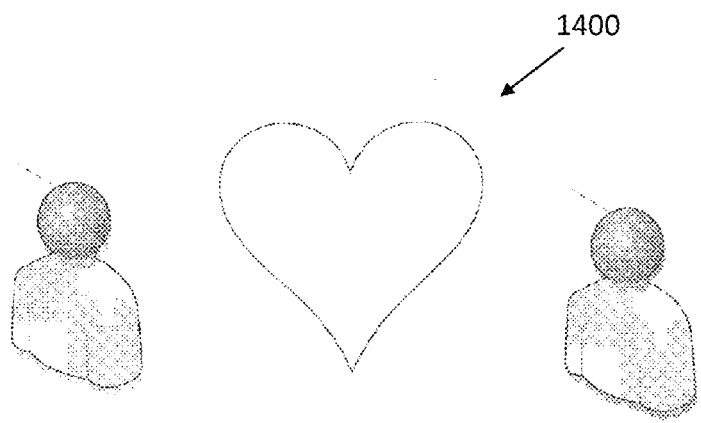
Fig. 14    Sharing between spouses

IDENTITY MANIPULATION DETECTION SYSTEM AND METHOD

BACKGROUND OF THE INVENTION

1. Field of Invention

The invention relates generally to identity (ID) management, theft, and risk assessment, and more particularly, to a technique for detecting systematic and deliberate manipulation of personal identity information.

2. Description of Related Art

According to the U.S. Department of Justice, identity theft and identity fraud are terms used to refer to all types of crime in which someone wrongfully obtains and uses another person's personal data in some way that involves fraud or deception, typically for monetary gain. Unlike fingerprints, which are unique to an individual and cannot be given to someone else for their use, personal data such as a Social Security number, bank account or credit card number, telephone number, name, date of birth, and address can be used by a criminal. In the United States, many people have reported that unauthorized persons have taken funds out of their bank or financial accounts, or, in the worst cases, taken over their identities altogether, running up vast debts and committing crimes while using a victim's name. In many cases, a victim's losses may include not only out-of-pocket financial losses, but substantial additional financial and emotional costs associated with trying to restore the victim's reputation in the community and correcting erroneous information for which the criminal is responsible. In 2010 alone, over 8 million Americans were victims of identity theft. With the prevalence of Internet commerce and online social networking, it has become much easier for criminals to collect and misuse the personal identity information of unsuspecting victims.

Identity fraud can occur without identify theft. For example, a fraudster may acquire someone's identity information legitimately, but then use it to commit fraud. Alternatively, a fraudster may change his own identity information, often slightly, to improperly access goods or services, as well as governmental resources. Typically, the identity change is to pass a credit check that a fraudster would likely fail or to otherwise avoid detection. There are many examples of, for example, a fraudster using slight variations of his Social Security number, and in doing so he will frequently inadvertently use someone else's Social security number. As an example, a registered sex offender may apply for a job with all of his true information, except with an intentional variation in his Social Security number in an attempt to avoid detection of his past criminal behavior. The registered sex offender does not care whose identity he uses, it is just different from his own, but he harms the person whose number he inadvertently uses. Identity fraud is a plague on society as it may be used to perpetuate organized crime by enabling money laundering, people trafficking, drug running, and terrorism.

It is estimated that over fifty (50) billion dollars have been lost by U.S. consumers and businesses annually since 2009 as a result of identity theft and fraud. The good news is that consumers are generally becoming more aggressive in monitoring, detecting, and preventing fraud with the help of technology and partnerships with financial institutions, government agencies, and identity theft protection companies. Numerous identity theft protection companies have been formed in recent years in order to provide subscribers with notifications to alert and resolve actual or potential identity misuse in, for example, credit applications, utility transactions, check orders, and payday loans, as well as provide resources to restore the subscriber's identity and recover any direct losses as a result of identity theft.

ID Analytics, Inc. (a wholly owned subsidiary of LifeLock, Inc.) utilizes its proprietary ID Network®—the only real time, cross-industry compilation of identity information—to glean insight into consumer identity behavior. The ID Network has grown to include over 700 billion aggregated identity attributes ("characteristics"), 2.9 million reported frauds, and 1.7 billion consumer transactions. The ID Network receives an average daily flow of over 45 million attributes via a constant stream of input from its members, including leading financial institutions, retailers, wireless providers, credit card issuers, auto and mortgage lenders, and other issuers of credit. This insight reveals, among other things, anomalous and potentially fraudulent activity. Every day, the largest U.S. companies and critical government agencies rely on ID Analytics to make risk-based decisions that enhance revenue, reduce fraud, drive cost savings and protect consumers.

ID Analytics has also developed and implemented an ID Score, which is a numeric value ranging from 001-999 and reflects the risk-level associated with a consumer's identity, i.e., the likelihood the consumer has been victimized by an identity thief—the greater the score, the greater the risk. The ID Score relies on data within the ID Network and provides an integrated view of each individual's identity characteristics and their connectedness to others' identity characteristics. These identity characteristics include, among other possible pieces of consumer data, Social Security number (SSN), name, address, home phone number, date of birth, cell phone number, e-mail address, and Internet Protocol (IP) address. The ID Score helps organizations effectively pinpoint first-party fraud, synthetic identities, and identity theft in real time. The technology behind the ID Network, ID Score, and applications thereof are discussed in United States Patent Application Publication No. 2006/0149674; and U.S. Pat. Nos. 7,458,508; 7,562,814; 7,686,214; and 7,793,835, the entire disclosures of which are all incorporated by reference herein. By applying advanced analytics to data within the ID Network, ID Analytics can quantitatively evaluate millions of desirable and suspicious behaviors and relationships in real time to understand identity risk. These analytics generate immediate and actionable insight including the authenticity of an identity, an applicant's creditworthiness, or a consumer's exposure to identity theft.

SUMMARY OF THE INVENTION

The present invention leverages the data in ID Analytics' ID Network to resolve identities and detect intentional falsification of personal identity information. In general, the invention detects variations of a particular person's identity information, such as the use of multiple social security numbers, multiple dates of births, and/or multiple improper changes to aspects of their name, to calculate an identity manipulation score which indicates the likelihood that a person intentionally attempted/is attempting to manipulate their information. The invention also includes attribute description details such that the variations, whether improper or benign, can be viewed.

In one embodiment of the invention, an identity manipulation detection system comprises: an identity network database comprising a plurality of identity records, wherein each identity record comprises identity information pertaining to one or more persons; and an identity resolution and manipulation detection computer coupled to the identity network database and configured to identify one or more improper manipulations by an individual of the identity information pertaining to the individual through analysis of the plurality of identity records, wherein the identity resolution and manipulation detection computer is further configured to generate an identity manipulation score for the individual based on the identified one or more improper manipulations by the individual. The identity manipulation database further comprises an attribute description of the identified one or more improper manipulations by the individual. The attribute description comprises identity information selected from the group consisting of: name, social security number, date of birth, phone number, address, and a combination thereof. The attribute description comprises the number of identified improper manipulations corresponding to a particular type of identity information. The identified one or more improper manipulations by an individual comprise deliberate and intentional manipulations of identity information pertaining to the individual. The identified one or more improper manipulations by an individual exclude unintentional and harmless manipulations of identity information pertaining to the individual. The generated identity manipulation score is also based on magnitude and type of variations of the identity information pertaining to the individual, wherein the magnitude and type of variations of the identity information pertaining to the individual are identified by the identity resolution and manipulation detection computer.

In another embodiment of the invention, an identity manipulation detection method comprising the steps of: analyzing, at a computer, a plurality of identity records, wherein each identity record comprises identity information pertaining to one or more persons; identifying, at a computer, one or more improper manipulations by an individual of the identity information pertaining to the individual; and generating, at a computer, an identity manipulation score for the individual based on the identified one or more improper manipulations by the individual. The method may further comprise generating an attribute description of the identified one or more improper manipulations by the individual. The attribute description comprises identity information selected from the group consisting of: name, social security number, date of birth, phone number, address, and a combination thereof. The attribute description comprises the number of identified improper manipulations corresponding to a particular type of identity information. The identified one or more improper manipulations by an individual comprise deliberate and intentional manipulations of identity information pertaining to the individual. The identified one or more improper manipulations by an individual exclude unintentional and harmless manipulations of identity information pertaining to the individual.

In another embodiment of the invention, a computer-readable medium having computer-executable instructions for performing a method comprising the steps of: analyzing a plurality of identity records, wherein each identity record comprises identity information pertaining to one or more persons; identifying one or more improper manipulations by an individual of the identity information pertaining to the individual; and generating an identity manipulation score for the individual based on the identified one or more improper manipulations by the individual. The method may further comprise generating an attribute description of the identified one or more improper manipulations by the individual. The attribute description comprises identity information selected from the group consisting of: name, social security number, date of birth, phone number, address, and a combination thereof. The attribute description comprises the number of identified improper manipulations corresponding to a particular type of identity information. The identified one or more improper manipulations by an individual comprise deliberate and intentional manipulations of identity information pertaining to the individual. The identified one or more improper manipulations by an individual exclude unintentional and harmless manipulations of identity information pertaining to the individual.

An advantage of the present invention is that it explicitly finds and identifies identity manipulators. Specifically, the invention has allowed the creation of a detailed list of many millions of people in the U.S. who are deliberately and improperly manipulating their personal identifying information (PII) as they apply for credit products and services, such as credit cards, loans and cell phones. By linking these discovered identity manipulators by common features, for example, by a mailing address, the system has identified several currently operating fraud rings in the United States that have gone undetected by conventional methods. Additionally, the system can detect parent/child identity theft, such as a mother improperly using the Social Security number of her infant, or an adult child improperly using the Social Security number of his elderly father. Further, the system can detect improper sharing of PII between spouses.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, and the advantages thereof, reference is now made to the ensuing descriptions taken in connection with the accompanying drawings briefly described as follows:

FIGS. 4-5 illustrate the processor associating people with events according to embodiments of the invention;

FIGS. 6-7 illustrate the processor examining variations in identity information to identify improper manipulations according to embodiments of the invention;

FIG. 8 illustrates the visibility the invention creates, where the invention allows the discovery and characterization of specific individuals who are perpetrating identity fraud.

FIGS. 9-10 illustrate the aggregate identity manipulation statistics based on geographic locations according to embodiments of the invention;

FIGS. 11-12 illustrate the processor identifying an identity fraud ring that manipulates identity information according to embodiments of the invention;

FIGS. 13-14 illustrate the processor detecting families which share or steal each other's identity information according to embodiments of the invention.

DETAILED DESCRIPTION OF EMBODIMENTS

Figure 1:
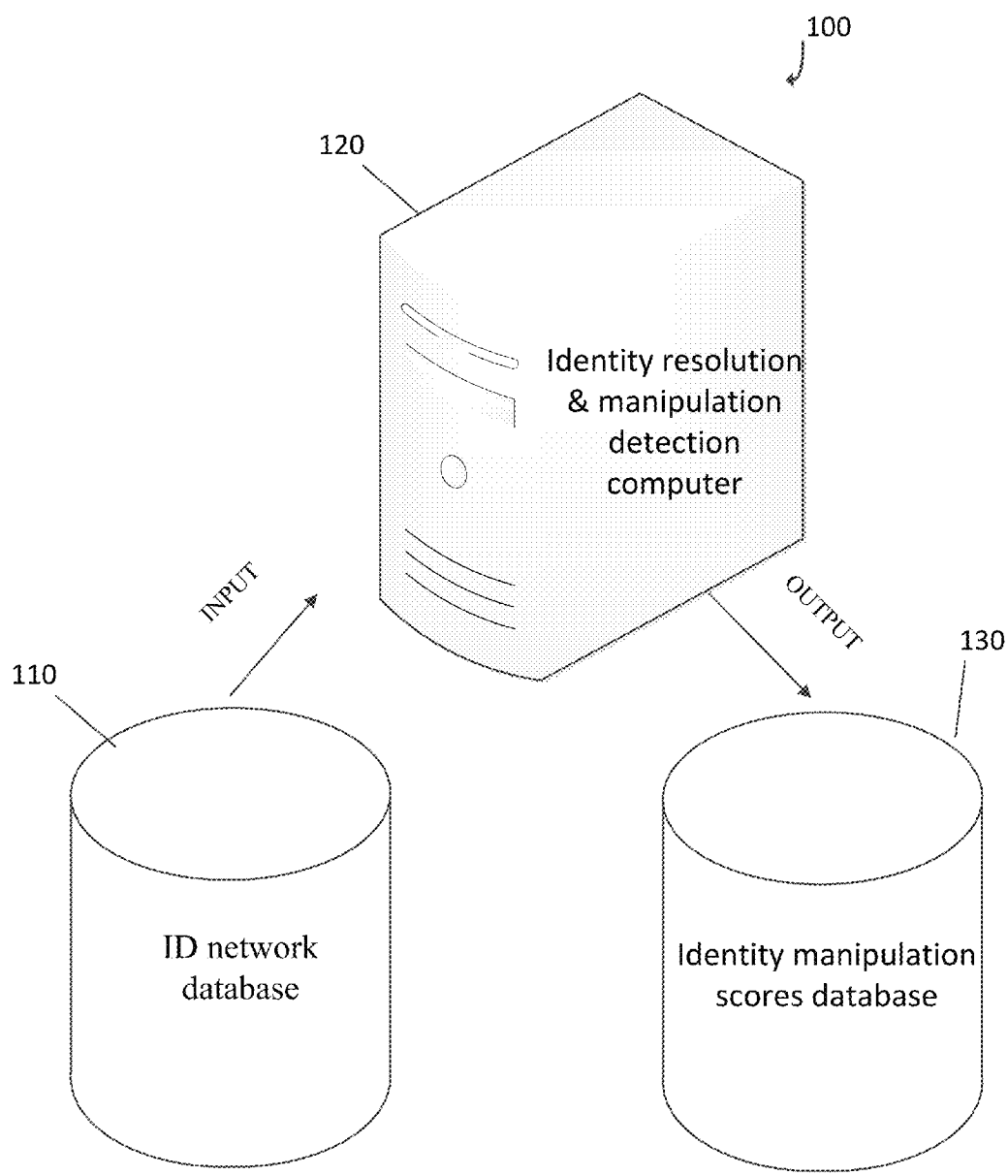
FIG. 1 illustrates an identity manipulation detection system according to an embodiment of the invention.

Further features and advantages of the invention, as well as the structure and operation of various embodiments of the invention, are described in detail below with reference to the accompanying FIGS. 1-16, wherein like reference numerals refer to like elements.

The present invention provides, in at least one embodiment, a system and method for identifying individuals who are deliberately and systematically attempting to improperly misrepresent their identity information. Identity information may include a person's name, social security number, date of birth, phone number, address, and other contact information. The first name can be their first, middle, and/or last name due to name misparsing issues. The contact information can include their mailing street address, city, zip code, and/or phone number. The present invention detects deliberate manipulation of a particular person's identity information, such as their Social Security number, date of birth, and some aspect of their name and address, and calculates an identity manipulation score, which is an indicator of the likelihood that the variations are improper manipulations as opposed to being benign changes, as well as the extent of the improper variations. Benign changes include legitimate last name changes due to marriage, address changes due to an authentic change of address, use of nicknames, and other common variations of name elements. Benign changes also include unintentional typographical errors. However, an intentional change that may look like a typographical error is not a benign change. It may be an attempt to falsify information, such as a false mailing address, name, or social security number. Improper manipulations are deliberate attempts to misrepresent one's identity information, and may include using several different Social Security numbers, date of births, and/or partial name changes. The system typically examines events for which the PII is by law required to be accurate, such as credit applications, but the invention can also be applied to a wider set of events that have less stringent accuracy requirements. The manipulation detection system can operate in real time, that is, as an applicant is applying for credit.

FIG. 1 illustrates an identity manipulation detection system 100 according to embodiments of the invention. Particularly, the identity manipulation detection system 100 comprises an identity (ID) network database 110, an identity resolution and manipulation detection computer 120, and an identity manipulation scores database 130.

In an embodiment of the invention, the identity network database 110 comprises a compilation of identity records pertaining to millions of individuals, i.e., persons, and consumer events. For example, the identity network database 110 may comprise all or a portion of ID Analytics, Inc.'s ID Network ID Network, which includes information associated with over 700 billion aggregated identity attributes ("characteristics"), 2.9 million reported frauds, and 1.7 billion consumer events. Events refer to any type of transaction or action (whether consummated or not) where identity related characteristics were shared. These identity characteristics include, among other possible pieces of consumer data, Social Security number (SSN), name, address, home phone number, date of birth, cell phone number, e-mail address, and Internet Protocol (IP) address. The ID Network receives an average daily flow of over 45 million attributes via a constant stream of input from its members, including leading financial institutions, retailers, wireless providers, credit card issuers, auto and mortgage lenders, and other issuers of credit. In essence, the ID Network captures consumers' unique identity elements—name, address, date of birth, telephone number, Social Security number, email address, IP address, etc.—and organizes the information in a way that enables highly granular and insightful analysis. The technology behind assembling and facilitating the ID Network is discussed in United States Patent Application Publication No. 2006/0149674; and U.S. Pat. Nos. 7,458,508; 7,562,814; 7,686,214; and 7,793,835, the entire disclosures of which are all incorporated by reference herein. The focus of the present invention is to leverage the data compiled in the ID Network in order to detect systematic, intentional, and improper first party identity manipulation that is otherwise not detected by conventional techniques.

The identity resolution and manipulation detection computer 120 comprises hardware and/or software for implementing one or more algorithms as discussed above. For example, the identity resolution and manipulation detection computer 120 may comprise a networked computer server, the identification and implementation of which is apparent to one of ordinary skill in the art. The identity resolution and manipulation detection computer 120 communicates with the ID network database 110 and/or identity manipulation scores database 130 via one or more conventional communications media and protocols, the identification and implementation of which is apparent to one of ordinary skill in the art. In an embodiment of the invention, the ID network database 110, the computer 120, and scores database 130 reside together on a local network. In another embodiment of the invention, the computer 120 may be located on a network remote from the ID network database 110 and/or scores database 130.

The identity manipulation scores database 130 comprises the output information generated by the identity resolution and manipulation detection computer 120. In an embodiment of the invention, the scores database 130 includes records comprising, among other things, a unique person label ("identity number") associated with an individual, a confidence factor indicating the likelihood that the individual is actually who it is, a best Social Security number, name, address, phone, and date of birth associated with that individual, and an ID Manipulation Score along with ID manipulations attributes. The ID network database 110 and scores database 130 may be implemented as any conventional database schema, the identification and implementation of which is apparent to one of ordinary skill in the art.

Figure 2:
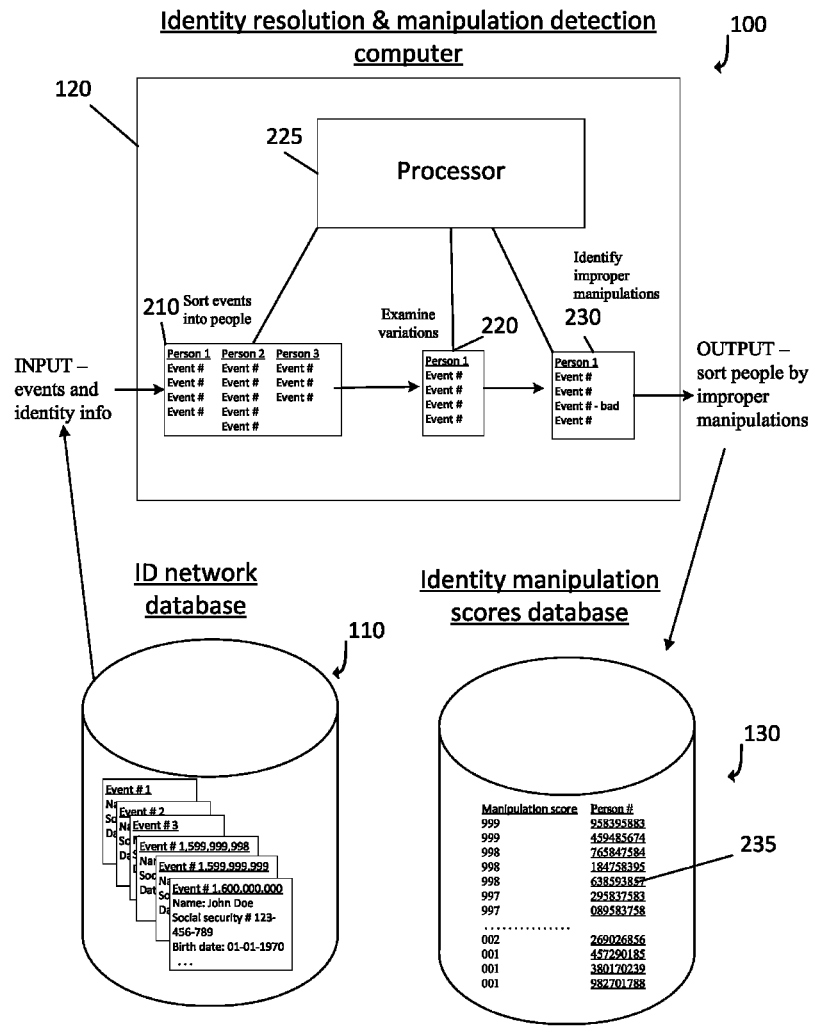
FIG. 2 illustrates the identity manipulation detection system according to an embodiment of the invention.

FIG. 2 also illustrates the identity manipulation detection system 100. The identity resolution and manipulation detection computer 120 comprises a processor 225 for analyzing the identity records stored in the ID network database 110 in order to identify the individual associated with the identity information in the identity records, identify improper manipulations in the identity information, and calculate an identity manipulation score based on the number of the improper manipulations, the type of the improper manipulations, and the systematic nature of the manipulations. The data required for and resulting from the sorting of events into people resides in the system 100, and part of this data is shown specifically as databases 210, 220, and 230.

In an embodiment of the invention, the identity manipulation score is dependent on variations in certain types of identity information, such as variations in the date of birth and Social Security number, which should not change, as opposed to changes in address or phone number, which are commonly changed. The identity manipulation score can also be dependent on the number of variations, such as three or more changes to Social Security numbers, dates of births, and/or multiple changes to aspects of their name. Multiple simultaneous changes in key fields such as SSN and date of birth are evidence that the changes are not typographic errors. The identity manipulation score can also be dependent on changes of a systematic nature, such as the change being an iterating number or letter from a previous change. Subtle changes in addresses or phone numbers are also considered in the calculation of the identity manipulation score.

The identity manipulation scores are outputted by the identity resolution and manipulation detection computer 120 and indicate the likelihood a certain individual has previously or currently intentionally falsified their personal identity information. The identity manipulation scores evaluate an individual's identity, as opposed to an event or transaction. The identity manipulation scores examine the variations of the personal identifying information used by each person ascertainable via the ID network 110 based on current and historical transactions involving identity information. The identity manipulation scores quantify the extent to which each person has deliberately and improperly misrepresented themselves through manipulation of their identity information. The identity manipulation scores focus primarily on the supposedly more permanent personal identifying information fields, that is, Social Security number, date of birth, and some aspects of name. The identity manipulation scores are designed to be tolerant to benign variations such as typos, nicknames, last name changes, and many (but not all) address variations.

In an embodiment of the invention, the ID network database 110 comprises more than 1.7 billion events for the 315 million people living in the United States. For example, illustrated event number #1,600,000,000 in FIG. 2 includes three types of identity information: name, Social Security number, and date of birth. The identity information is a for a person named John Doe, with Social Security number 123-456-789, and a birth date of Jan. 1, 1970. The event may have been a request for government benefits or other goods and services. In addition to a name, Social Security number, and birth date, this event may also include other identifying information, such as a mailing address, phone number, driver's license number, etc.

In the database 220, the processor 225 examines the variations in the events for each person as well as all other available assertions of PII. For example, the processor 225 compares the identity information in the four events of person number one. By comparing the events, the processor 225 is able to determine if there are any potentially improper variations in the identity information. In database 230, the processor 225 determines which of the variations appear intentionally false and which appear benign. Benign variations include legitimate changes such as a change in mailing address and unintentional typos, such as an incorrectly typed in Social Security number. However, multiple instances of the same typographical errors increases the likelihood that the errors were not typos at all, and instead were intentional attempts to falsify identity information.

The processor 225 sorts, examines, and identifies manipulations using algorithms. In a simple scenario, a person has four credit events, where four different Social Security numbers are used, but the remaining identity information stays the same. The algorithms of the processor 225 can determine that the person is likely intentionally falsifying their Social Security number. In a more complicated scenario, the algorithms of the processor 225 uses rules and statistical probabilities to determine that a particular person sometimes uses a different name, sometimes uses a different mailing address, and sometimes uses a different date of birth.

The identity manipulation scores are outputted from the identity resolution and manipulation detection computer 120. The identity manipulation scores can be scores based on the number or types of improper manipulations, such that the people who most likely have falsified identity information are at the top of a rank-ordered score list. For example, a high-scoring real person named James, who lives in Los Angeles, has used 10 different Social Security numbers, 14 different dates of births, and eight last names. There is little doubt that James is committing identity fraud, some of which has likely gone unnoticed by conventional systems.

The processor 225 and data structure of the system 100 can be based on a complex hierarchical representation of all the identity variations seen for the hundreds of millions of Americans as they apply for commercial products and services. The system 100 has detailed visibility into all the different personal identifying information variations used, and the system 100 can quantify these variations on a continuum from benign and appropriate on one end, to deliberately improper and likely criminal on the other end. For example, the system 100 has detected particular individuals deliberately using dozens of Social Security numbers and/or dates of birth as they apply for credit products.

With this unique visibility and identity resolution capability, the system 100 has within it a set of complex algorithms that examine and quantify the nature and extent of deliberate and improper identity manipulations for each of these (to date) 315 million individuals who are or have been active in the United States using commercial products and services. The system 100 has created a manipulation score that measures the deliberate and improper manipulation of personal identifying information. Specifically, this score algorithm examines the variations in Social Security numbers, dates of birth, names, and addresses used by each individual as they apply for credit products and services. The system 100 looks for multiple uses and other nontrivial variations, thus eliminating as best as possible simple typos. The identity manipulation scores are tolerant to typos in Social Security numbers, dates of birth, use of nicknames in the first name (e.g., John, Johnny, Jack, etc.), last name changes, and common address variations. The identity manipulation scores are designed to avoid such typos and false alarms and to focus on the identity variations that are intentional and improper.

The attributes link 235 is tied to an attribute description. Each person in the identity manipulation scores database 130 has a unique label 235 assigned to them, and associated with this label is a number of data elements including the identity manipulation score, a collection of the most likely correct PII, and a set of identity manipulation attributes. These identity manipulation attributes describe in detail how a person is manipulating his identity, such as the number of Social Security numbers used, number of dates of birth, etc. The identity manipulation attributes give insight into what is going on with this person in his commercial world interactions. The identity manipulation attributes are a summary of characteristics that are associated with that particular person.

In one embodiment, the identity manipulation attributes are: the number of Social Security numbers including possible typos; the number of Social Security number manipulations excluding likely typos; the number of dates of birth including possible typos; the number of date of birth manipulations excluding likely typos; the number of simultaneous Social Security number and date of birth manipulations, where if both are simultaneously manipulated, that is a strong indication of deliberate intent; the number of first name roots where a first name root is associated with each set of nicknames, so this attribute indicates the number of essentially different first names used (e.g., Steve, Stephen, Stevie are all considered the same first name, but Steve and Fred are different); the number of last names where the number is essentially different last names, ignoring very slight variations; the number of address manipulations where this counts the number of instances where the system 100 observes suspicious address variations, such as 100 main street and 100 main street unit 1, assigned to a single family dwelling. These particular attributes are measures of the types of variations that are typically associated with fraudulent identity manipulations.

Figure 3:
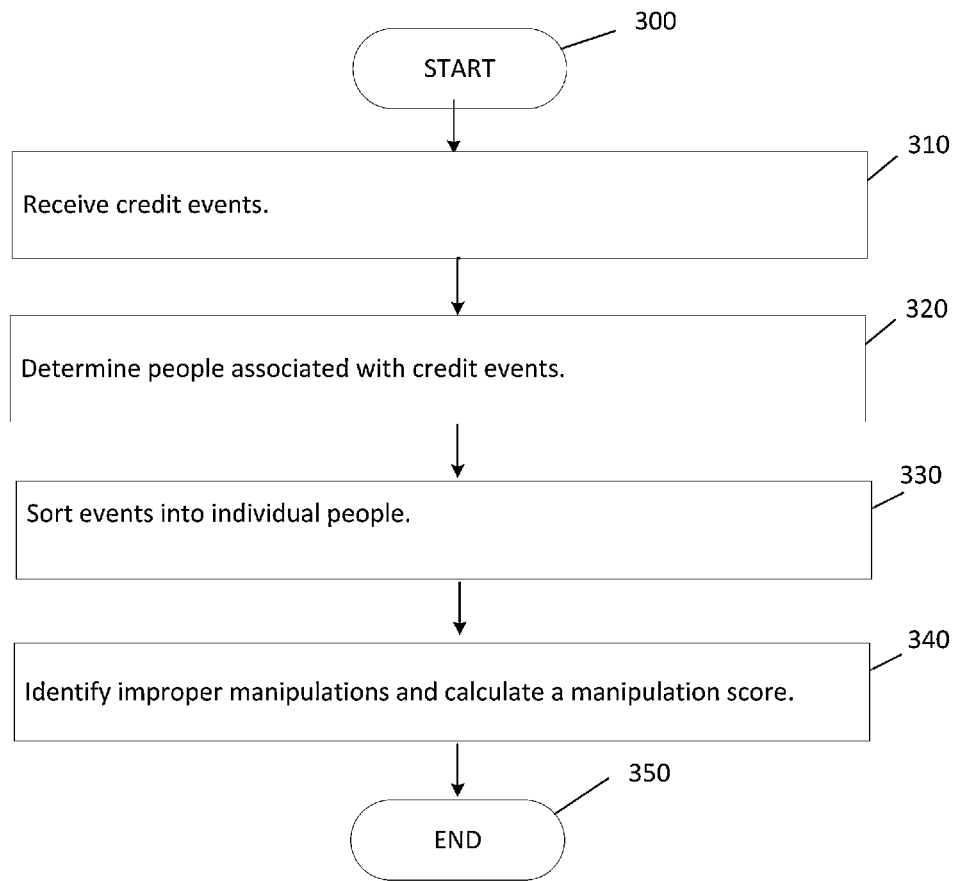
FIG. 3 illustrates a process of detecting people's intentional falsification of their personal identity information according to an embodiment of the invention.

FIG. 3 illustrates a process of detecting people's intentional falsification of their personal identity information according to an embodiment of the invention. The process starts at step 300. At step 310, the identity resolution and manipulation detection computer 120 receives credit events. Other background data with PII is also loaded into the system 120, such as U.S. white page records and credit bureau header data, typically on a batch basis. The credit events can be the 1.7 billion transactions located in the ID network database 110. Then, at step 320, the processor 225 determines the people associated with the credit events. This is done using the identity resolution system 120 of data and algorithms. Once the person behind the event is determined, a unique person number is assigned to this event. In step 330, the events are sorted by people so all the events are now organized at the people level. Now the system 120 can examine all the events looking at each person one at a time. The processor 225 identifies improper manipulations and calculates an identity manipulation score based on the improper manipulations observed at step 340. The processor 225 also calculates the attributes of the person, where the attributes include the person's identity information and all variations used. Improper manipulations can be determined by the variations of the personal identifying information, combined with running an algorithm to identify bad manipulations. The algorithm is tolerant of identity variations that are benign, especially non-systematic address and last name changes. Improper manipulations may be multiple names, Social Security numbers, or dates of birth. The processor 225 watches more closely for changes of a systematic nature (e.g., 700, 701, 702, etc.), multiple variations (e.g., 3 or more Social Security numbers), and variations of certain types of supposedly permanent identity information (e.g., Social Security numbers and dates of birth). The process may be repeated recursively a number of times and ends at step 350.

It is to be recognized that depending on the embodiment, certain acts or events of any of the methods described herein can be performed in a different sequence, may be added, merged, or left out altogether (for example, not all described acts or events are necessary for the practice of the method). Moreover, in certain embodiments, acts or events may be performed concurrently, for example, through multi-threaded processing, interrupt processing, or multiple processors, rather than sequentially.

FIGS. 4-5 illustrate the processor 225 associating people with events according to embodiments of the invention. FIG. 4 illustrates an exemplary intermediate output 400 of the processor 225 according to an embodiment of the invention. Here, the processor 225 has sorted the events stored in the ID network 110 by associated individual, i.e., person, (whether real or not). The sorting occurs by taking advantage of the overlap of identity information in events, such as the same or similar name, Social Security number, and date of birth. In the illustrated embodiment, person number one has four different events associated with him or her. FIG. 4 provides more detail for the database 210 which sorts events into people groupings. For example, the database 210 illustrates person number one having four events out of the 1.7 billion events in the identity network database 110.

FIG. 5 is a chart 500 that matches up a remotely-observed (e.g., online) person with the most likely person already determined from the identity network database 110. This determination can be accompanied by a confidence factor (not shown) indicating the likelihood that the matchup is correct.

FIGS. 6-7 illustrate the processor 225 examining variations in identity information to identify improper manipulations according to embodiments of the invention. FIG. 6 illustrates an example 600 of some of the information in the database 220, where there are many instances of asserted PII with both proper and improper variations. In this embodiment, the database 220 has more than four events that are combined. The database 220 lists the unique names, social security numbers, dates of birth, addresses, and phone numbers used by a particular person based on events linked to them.

FIG. 7 uses the processor 225 to identify the improper manipulations statistically. The processor 225 watches closer for changes of a systematic nature (e.g., 700, 701, 702, etc.), multiple variations (e.g., 3 or more Social Security numbers), and certain types of identity information (e.g., Social Security numbers and dates of birth). In this case 700, the person has used three different first names, five different last names, two social security numbers, and two dates of birth. Included in the algorithm used for finding improper PII manipulations are additional fields not shown explicitly here but reside in database 220, such as number and dates of occurrences, etc. The multiples changes in these types of identity information indicate a strong likelihood of fraud.

Figure 10:
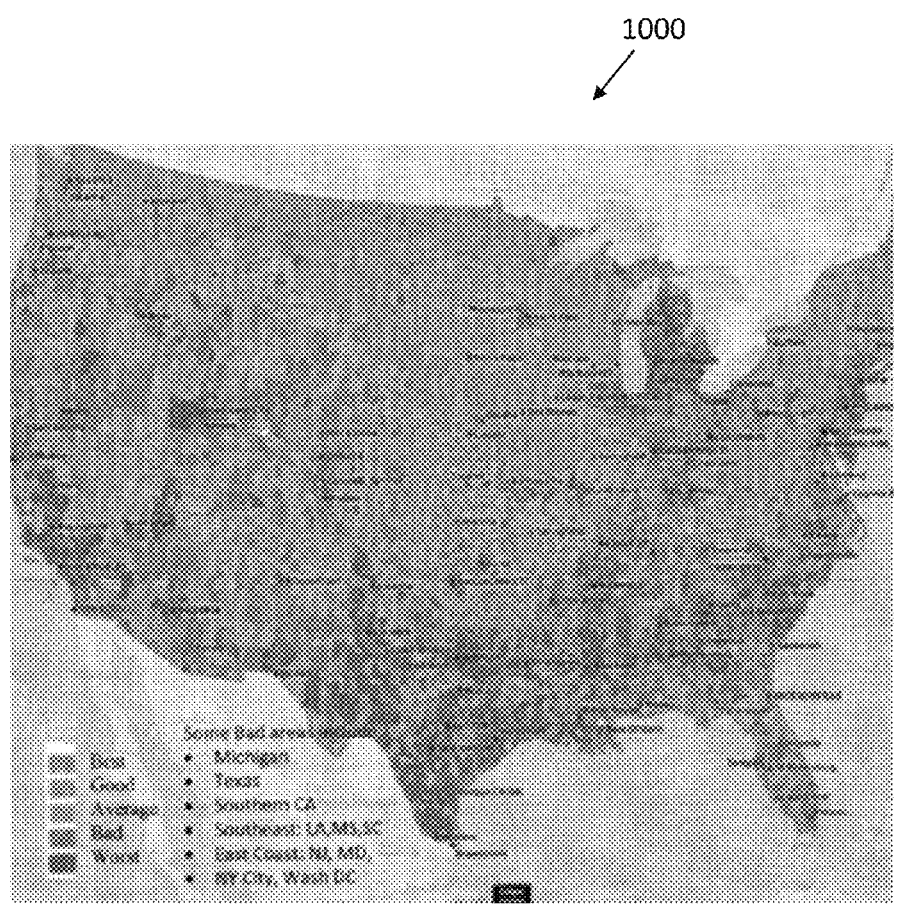

FIGS. 8-10 illustrate the identity manipulation statistics based on geographic locations according to embodiments of the invention. FIG. 8 illustrates the processor 225 identifying summary statistics 800 specific of individuals who are doing a high amount of identity manipulation. This list can be generated by rank ordering the more than 300 million scored individuals in the U.S. by their identity manipulation score, and examining this list from the top down. FIG. 8 also illustrates some identity manipulation attributes, including the number of Social Security numbers, the number of dates of birth, number of first names, etc. This list generated by the present invention allows for the discovery and subsequent investigation of many previously undetected individuals committing this identity manipulation type of fraud.

FIG. 9 illustrates the processor 225 aggregating into a chart 900 the U.S. population into geographic areas, in this instance 3-digit zip code regions, and calculating the level of identity manipulation occurring in that region by examining the associated identity manipulation scores of the individuals in that region. In this figure, the regions have been sorted according to decreasing level of identity manipulation, revealing which geographic regions have the highest level of identity manipulation.

FIG. 10 illustrates a map 1000 generated by the processor 225 identifying the resulting 3-digit level information for the entire U.S., where this figure illustrates exactly which regions have high and low per capita levels of identity manipulation.

FIGS. 11-12 illustrate the processor 225 identifying an identity fraud ring: a group of people who collaborate in the manipulation of identity information, according to embodiments of the invention. The chart 1100 in FIG. 11 shows some of the identity manipulation attributes for individuals in a fraud ring in Texas, first discovered by the processor 225. The processor 225 detected this ring partly because they shared addresses, fragments of names, fragments of Social Security numbers, and fragments of date of births. The graph 1200 in FIG. 12 illustrates another view of this fraud ring, showing the proximity of their locations in Fort Worth, Tex. This is illustrative of the many previously-undiscovered fraud rings that can be detected by the systematic application of the present invention.

FIGS. 13-14 illustrate the processor 225 detecting families which share or steal each other's identity information according to embodiments of the invention. The graph 1300 in FIG. 13 illustrates the age and percentage of total fraud of people in a family who participate in identity manipulation. The bump in the curve around infants likely means that some parents are using the identity information of their children without their permission. And due to only a gradual drop off as the age approaches 100, it is also likely that many of living and dead over 80 years old, have their identity information improperly being used by their adult children, likely without their permission.

FIG. 14 illustrates a married couple 1400. The processor 225 has found that many married couples improperly use the identity information from the other spouse to obtain goods and services, with or without their permission. Even though sharing identity information with another with their permission is not theft against that person, it is still fraudulent against the companies that are offering the goods and services.

The system 100 has shown that nearly 6 million families inappropriately share identity information. The system 100 has also shown that about 500,000 children under the age of 18 have had their identities stolen by a parent. More surprising, two to three million elderly parents are likely victims of identity theft initiated by their adult children. While other systems examine child identity fraud and theft by random thieves, the system 100 is the first to examine how many parents are perpetrating this criminal act on their own children. This is also the first time that there is data on adult children that are improperly using their elderly parents' identities.

Figure 15:
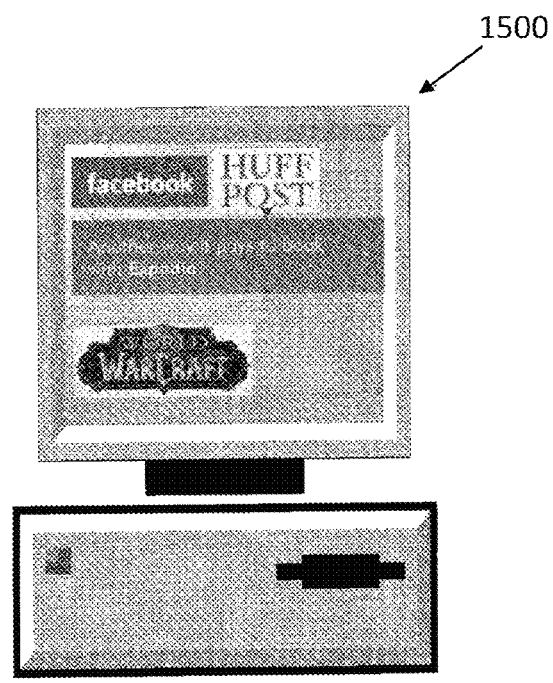
FIGS. 15-16 illustrate uses for the identity manipulation detection system according to embodiments of the invention.
Figure 16:
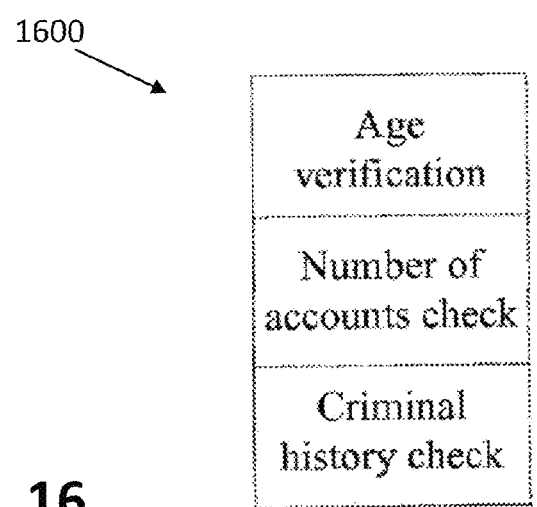

FIGS. 15-16 illustrate uses for the system 100 according to embodiments of the invention. FIG. 15 illustrates a computing device 1500 having access to one or more social networks (e.g., Facebook, MySpace, LinkedIn, Twitter, etc.), loyalty programs (e.g., airlines, hotels, grocery stores, etc.), online gaming (e.g., World of Warcraft, PlanetSide, Gaia Online, etc.), and blogs (e.g., Buffington Post, Gizmodo, BusinessInsider, etc.). The computing device may have access to other goods and services as well, such as bank accounts, mortgages, credit cards, retail products, job applications, rental applications, state benefits, dating websites, etc. The processor 225 helps these businesses detect which applicants have likely previously manipulated or are currently manipulating their identity, along with attributes describing the applicant's prior events. These identity manipulations can be occurring for a number of reasons, including improperly applying for or holding multiple accounts, thus receiving products or services under false pretenses. These can include both commercial or governmental products and services.

FIG. 16 illustrates additional uses for the system 100. A chart 1600 illustrates an age verification check, a number of accounts check, and a criminal history check. The age verification check may be appropriate for online sales of restricted items such as guns and alcohol. A number of account checks may be appropriate to identify people having too many accounts opened, such as for collection of state benefits. A criminal history check may be appropriate for sites popular with children, social networking, and dating. For example, when one particular social networking site was checked by the system 100, its users comprised more than 100,000 registered sex offenders, about 3 million very bad identity manipulators, about 1,000 people on the Office of Foreign Assets Control (OFAC) watch list, and about 5 million deceased people.

The system 100 has performed with unexpectedly good results. The results indicate that identity manipulation is far more prevalent than is commonly reported on identity theft statistics. In an experiment, the first national study of its kind, the system 100 examined identity manipulation in a population of about 300 million American adults. The system 100 looked beyond innocuous identity variations such as typos and name changes, and the system 100 concluded that at least 20 million, or about 7 percent of Americans, have improperly manipulated their identity in applications for credit, cell phone service, auto loans, or other credit transactions. In this experiment, the system 100 examined at least Social Security numbers, names, and dates of birth.

In this experiment, the system 100 built a heuristic score that quantified the amount of identity variation for each of the approximately 300 million adults living across the country. The heuristic score quantitatively assessed the extent and methods that each person used in varying their identity information. In particular, the system 100 looked for variations of a systematic nature in key fields such as Social Security number and date of birth. For example, a systematic variation in dates of birth includes, for example, Jan. 1, 1980, Feb. 1, 1980, and Mar. 1, 1980.

In building this heuristic score, the system 100 used the following techniques to distinguish accidental variation from intentional, deliberate manipulation: the system 100 did not penalize variations in last name up to five last names; the use of more than five last names started to contribute in a weak way to the identity manipulation score; the algorithms of the processor 225 excluded first name variations based on nicknames (i.e., Fred, Frederick, Freddie); the system 100 further ruled out typos and other accidental variations.

The typos were excluded through a combination of: commercially available name and address standardization software; data cleaning algorithms; and careful examination of the frequency of the observed variations. For example, if a different social security number or date of birth was used once and only once, the system 100 considered that to be a typo and not deliberate manipulation.

Research shows that about six percent of people in the United States have more than one social security number associated with their name. About half of these, approximately three percent, appear to be due to data entry errors. A person therefore has about a three percent chance of having a typo in their list of personal identifying information. The chances of a person independently have two typos would be about 3/100 times 3/100, are about one in one thousand. Therefore, more than one simultaneous variation on a person's information is likely a deliberate manipulation.

The processor 225 performed a careful examination and quantification of the nature of the variations. The identity manipulation scores can be affected by sequential variations of digits in the Social Security number, the year, month and day of the date of birth. Multiple sequential variations are less likely to be by accident or chance. For example, address changes of 100 Main St to 101 Main St, to 102 Main St are more likely to be intentionally false.

The results found that eight million people deliberately and improperly used two or more social security numbers, 16 million people used multiple dates of birth, and 10 million people used their spouses' information. Using the spouses' information includes a person modifying a portion of their identity information to include their spouse's Social Security number. The results further found that two million people misused either their parents' identity or children's' identity, which was concluded when family members had manipulated identities, and the family members had dates of births differing by 18 to 25 years.

The results determined that the highest rates of identity manipulators live in the metro and border areas, including Detroit, Flint, Lansing, Dallas, Houston, Corpus Christi, El Paso, and McAllen. The area with the highest rate of manipulators was outside of Houston. The state with the highest rate of manipulators was Texas.

The top overall manipulator had used 165 Social Security numbers, 44 dates of birth, three different first names, and resides in Philadelphia. While this individual is engaged in malicious misuse of identities through systematic and multiple variations of identity elements, the severity of other identity manipulators occurs in a continuum going from benign to clearly criminal. Some people are simply inconsistent with the use of their name resulting in benign variations, whereas other people clearly misuse their identities to commit fraud.

There are many reasons why people manipulate identity information. Fraudsters change key identity components, essentially inventing fictitious identities to fraudulently obtain products and services. Some people may apply for products using slight variations of their true identity to avoid a past delinquent history. Others may use their spouse's Social Security number to leverage a better credit score. Sex offenders and illegal immigrants may live under aliases to avoid detection, while other identity manipulators seek to gain improper access to healthcare or government benefits and services. There is definitely more research to be done to understand the factors driving identity manipulators' activities.

The results indicate that identity manipulation is far more prevalent than commonly reported statistics on identity theft. Identity fraud includes situations where a thief assumes an innocent person's identity entirely (identity theft) and also includes situations where the person deliberately changes a portion of their identity in order to improperly obtain benefits and other goods (identity manipulation).

The following is a description of the specialized data used for the system 100 to obtain the identity manipulation score according to an embodiment of the invention. The data for the identity manipulation score has been carefully prepared and organized by constructing a specially organized hierarchical data structure that attempts to resolve to the unique individual level, retaining all the relevant variations ever seen in the presentations of personal identifying data (PII), primarily SSN, date of birth, first, middle and last name, addresses, phone numbers and emails. This hierarchical structure has as its root nodes the most permanent elements of PII (SSNs, dates of birth) and cascades downward in the hierarchy, branching on different more transitory PII elements such as last name, addresses and phone numbers. All the data elements are date-range stamped and have counts for the number of occurrences of that value observed. As the data is loaded into this system, a number of special data cleansing and preprocessing steps are performed to maximize the retention of important consumer-driven variations and minimize the number of data entry errors. These special steps include operations like first/last/middle name parsing and swapping algorithms, identification of common nickname variations, address cleaning and standardization, and specially-designed typo correction processes. The outcome of this special data organization is the ability to view all the relevant PII variations observed at the individual level. It should be noted that the data events that the system 100 is examining are generally applications for credit products and services—situations where the consumer is required by law to represent himself correctly.

The following is a description of the algorithmic process of the system 100 for the identity manipulation score according to an embodiment of the invention. The Identity Manipulation Score (IM Score) is a purpose-built algorithm to quantify the extent of improper and deliberate uses of PII by a consumer. The IM Score algorithm is an unsupervised model. It consists of a set of rules that operate on the above-described hierarchical data. It examines this specially-designed collection of data that shows all the variations of PII presented around a particular individual. The IM Score is the result of a series of complex custom-built fuzzy matching and weighted voting rules that are designed to focus on deliberate and improper PII variations while being robust to likely typos. The outcome of the IM Score algorithm is a quantitative measure of the extent that a particular person has deliberately and improperly manipulated his identity in the process of trying to obtain products and services.

The system 100 which produces an identity manipulation score is completely different from other ID Scores in both the algorithm and data used, although the data used has similar sources. The system 100 is a specialized algorithm built around specialized data, both different from other ID Scores. Prior ID Scores included a supervised model, trained by looking at past labeled (known) fraud data. In contrast, the system 100 is an unsupervised model, and is a collection or rules, fuzzy matching and weighted voting, operating on a special hierarchically-organized data set specifically designed for identity resolution and identity manipulation quantification. The system 100 catches additional and different types of fraud beyond what is caught by the conventional ID Scores.

The system 100 looks at unusual variations in PII as asserted by one person. The system's data set has been specially built from the ID Network for a particular purpose different from the ID Score. The data of the system 100 is used for Identity Resolution, figuring out who is who by looking at a people-centric view of PII variation. It was then discovered that this new Identity Manipulation score algorithm could be built on top of this Identity Resolution data.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

What is claimed is:

1. An identity manipulation detection system comprising:
   an identity network database comprising a plurality of consumer events; and
   an identity resolution and manipulation detection computer coupled to the identity network database and configured to:
   determine a plurality of persons associated with the plurality of consumer events;
   determine an identity for each one of the determined plurality of persons;
   assign a unique person number to each one of the plurality of consumer events;
   sort the plurality of consumer events by assigned unique person number;
   examine the sorted plurality of consumer events by each one of the determined plurality of persons;
   identify improper identity manipulations by each one of the determined plurality of persons; and
   generate, for each one of the determined plurality of persons, an identity manipulation score based on the identified improper identity manipulations, wherein the identity manipulation score is associated with a determined person and indicates a likelihood that the determined person has intentionally falsified his or her identity; and an identity manipulation scores database comprising a record for each one of the determined plurality of persons, the record comprising a unique person number, a determined identity, and a generated identity manipulation score.

2. The identity manipulation detection system of claim 1, wherein the identity resolution and manipulation detection computer is further configured to generate an attribute description for each one of the identified improper manipulations.

3. The identity manipulation detection system of claim 2, wherein the attribute description comprises identity information selected from the group consisting of: name, social security number, date of birth, phone number, address, and a combination thereof.

4. The identity manipulation detection system of claim 3, wherein the attribute description comprises the number of identified improper identity manipulations corresponding to a particular type of identity information.

5. The identity manipulation detection system of claim 1, wherein the identified improper identity manipulations comprise deliberate and intentional identity manipulations.

6. The identity manipulation detection system of claim 5, wherein the identified improper identity manipulations exclude unintentional and harmless identity manipulations.

7. The identity manipulation detection system of claim 1, wherein the generated identity manipulation score is also based on magnitude and type of variations of identity information, wherein the magnitude and type of variations are identified by the identity resolution and manipulation detection computer.

8. An identity manipulation detection method comprising the steps of:
    analyzing, at a computer, a plurality of consumer events;
    determining, at a computer, a plurality of persons associated with the plurality of consumer events;
    determining, at a computer, an identity for each one of the determined plurality of persons;
    assigning, at a computer, a unique person number to each one of the determined identities;
    identifying, at a computer, improper identity manipulations by each one of the determined plurality of persons;
    generating, at a computer, an identity manipulation score for each one of the determined plurality of persons based on the identified improper identity manipulations, wherein the identity manipulation score is associated with a determined person and indicates a likelihood that the determined person has intentionally falsified his or her identity; and
    storing, at a computer, a record for each one of the determined plurality of persons, the record comprising a unique person number, a determined identity, and a generated identity manipulation score.

9. The identity manipulation detection method of claim 8, further comprising the step of generating an attribute description for each of the identified improper identity manipulations.

10. The identity manipulation detection method of claim 9, wherein the attribute description comprises identity information selected from the group consisting of: name, social security number, date of birth, phone number, address, and a combination thereof.

11. The identity manipulation detection method of claim 10, wherein the attribute description comprises the number of identified improper identity manipulations corresponding to a particular type of identity information.

12. The identity manipulation detection method of claim 8, wherein the identified improper identity manipulations comprise deliberate and intentional identity manipulations.

13. The identity manipulation detection method of claim 12, wherein the identified improper identity manipulations exclude unintentional and harmless identity manipulations.

14. A non-transient computer-readable medium having computer-executable instructions for causing a computer to perform a method comprising the steps of:
    analyzing a plurality of consumer events;
    determining a plurality of persons associated with the plurality of consumer events;
    determining an identity for each one of the determined plurality of persons;
    assigning a unique person number to each one of the determined identities;
    identifying improper identity manipulations by each one of the determined plurality of persons;
    generating an identity manipulation score for each one of the determined plurality of persons based on the identified improper identity manipulations, wherein the identity manipulation score is associated with a determined person and indicates a likelihood that the determined person has intentionally falsified his or her identity; and
    storing a record for each one of the determined plurality of persons, the record comprising a unique person number, a determined identity, and a generated identity manipulation score.

15. The non-transient computer-readable medium of claim 14, further comprising the step of generating an attribute description for each one of the identified improper identity manipulations.

16. The non-transient computer-readable medium of claim 15, wherein the attribute description comprises identity information selected from the group consisting of: name, social security number, date of birth, phone number, address, and a combination thereof.

17. The non-transient computer-readable medium of claim 16, wherein the attribute description comprises the number of identified improper identity manipulations corresponding to a particular type of identity information.

18. The non-transient computer-readable medium of claim 14, wherein the identified improper identity manipulations comprise deliberate and intentional identity manipulations.

19. The non-transient computer-readable medium of claim 18, wherein the identified improper identity manipulations exclude unintentional and harmless identity manipulations.

20. An identity manipulation detection method comprising the steps of:
    analyzing, at a computer, a plurality of consumer events;
    determining, at a computer, a plurality of persons associated with the plurality of consumer events;
    determining, at a computer, an identity for each one of the determined plurality of persons;
    determining, at a computer, an address for each one of the determined plurality of persons;
    identifying, at a computer, for each one of the determined plurality of persons, improper identity manipulations;
    generating, at a computer, an identity manipulation score for each one of the determined plurality of persons based on the identified improper identity manipulations, wherein the identity manipulations score is associated with a determined person and indicates a likelihood that the determined person has intentionally falsified his or her identity;
    identifying one or more geographic regions associated with the generated identity manipulation scores;

calculating the level of identity manipulation in each one of the one or more geographic regions; and sorting the one or more geographic regions by the calculated level of identity manipulation.

21. An identity manipulation detection method comprising the steps of:

analyzing, at a computer, a plurality of consumer events;

determining, at a computer, a plurality of persons associated with the plurality of consumer events;

determining, at a computer, an identity for each one of the determined plurality of persons;

identifying, at a computer, for each one of the determined plurality of persons, improper identity manipulations;

generating, at a computer, an identity manipulation score for each one of the determined plurality of persons based on the identified improper identity manipulations, wherein the identity manipulations score is associated with a determined person and indicates a likelihood that the determined person has intentionally falsified his or her identity; and identifying two or more of the determined identities who share common identity information.

22. The method of claim 21, wherein the common identity information is an address, a portion of a name, a portion of a social security number, or a portion of a date of birth.

* * * * *